US012580840B2

(12) United States Patent
Manolescu et al.

(10) Patent No.: US 12,580,840 B2
(45) Date of Patent: Mar. 17, 2026

(54) METHODS, SYSTEMS, AND COMPUTER READABLE MEDIA FOR LINK MULTIPLEXING AND FORWARDING PACKETS IN A TEST ENVIRONMENT

(71) Applicant: Keysight Technologies, Inc., Santa Rosa, CA (US)

(72) Inventors: Radu Manolescu, Bucharest (RO); Dan George Ciobanu, Bucharest (RO); Lai Fun Laura Choy, Vancouver (CA); Bogdan-Cosmin Chifor, Bucharest (RO)

(73) Assignee: KEYSIGHT TECHNOLOGIES, INC., Santa Rosa, CA (US)

( * ) Notice: Subject to any disclaimer, the term of this patent is extended or adjusted under 35 U.S.C. 154(b) by 445 days.

(21) Appl. No.: 18/137,415

(22) Filed: Apr. 20, 2023

(65) Prior Publication Data

US 2024/0356832 A1 Oct. 24, 2024

(30) Foreign Application Priority Data

Apr. 18, 2023 (RO) ............................... a 2023 00190

(51) Int. Cl.
*H04L 43/55* (2022.01)
*H04L 45/76* (2022.01)

(52) U.S. Cl.
CPC .............. *H04L 43/55* (2022.05); *H04L 45/76* (2022.05)

(58) Field of Classification Search
CPC ................................. H04L 43/55; H04L 45/76
USPC ......................................................... 370/241
See application file for complete search history.

(56) References Cited

U.S. PATENT DOCUMENTS

| | | | |
|---|---|---|---|
| 4,726,017 A | 2/1988 | Krum et al. | |
| 7,039,018 B2 | 5/2006 | Singh et al. | |
| 8,223,767 B2 | 7/2012 | Nanda et al. | |
| 8,228,910 B2 | 7/2012 | Wu et al. | |

(Continued)

FOREIGN PATENT DOCUMENTS

| | | |
|---|---|---|
| CN | 110719211 B | 9/2024 |
| EP | 2523401 A1 | 11/2011 |

(Continued)

OTHER PUBLICATIONS

Notice of Allowance for U.S. Appl. No. 17/896,057 (Jan. 16, 2024).

(Continued)

*Primary Examiner* — Melvin H Pollack

(57) ABSTRACT

Methods, systems, and computer readable media for link multiplexing and forwarding packets in a test environment are disclosed. One example method occurs at a network switch comprising a first plurality of ports and a second plurality of ports, wherein each of the first plurality of ports is connected to one of a plurality of traffic generators and each of the second plurality of ports is connected to a system under test (SUT). The method comprises receiving, by the network switch, test packets via the first plurality of ports, wherein a first portion of the test packets includes a first aggregation identifier associated with a first egress port of the second plurality of ports; and forwarding, using the first aggregation identifier and at least one corresponding egress forwarding rule, the first portion of the test packets via the first egress port toward the SUT.

18 Claims, 7 Drawing Sheets

(56)　　　References Cited

U.S. PATENT DOCUMENTS

| | | | |
|---|---|---|---|
| 8,687,483 B2 * | 4/2014 | Hutchison | H04L 47/266 |
| | | | 370/429 |
| 8,717,888 B2 | 5/2014 | Sankar et al. | |
| 8,780,896 B2 | 7/2014 | Mehra | |
| 8,855,124 B2 * | 10/2014 | Haddock | H04L 12/4633 |
| | | | 370/352 |
| 8,885,493 B2 | 11/2014 | Sundaram et al. | |
| 9,036,472 B2 * | 5/2015 | Fidler | H04L 43/04 |
| | | | 370/230.1 |
| 9,401,872 B2 | 7/2016 | Vobbilisetty et al. | |
| 9,491,083 B2 | 11/2016 | Brolin et al. | |
| 9,537,785 B2 | 1/2017 | Bergeron | |
| 9,584,421 B2 | 2/2017 | Rai et al. | |
| 9,628,339 B1 | 4/2017 | Thai et al. | |
| 9,628,356 B2 * | 4/2017 | Gintis | H04L 43/045 |
| 10,110,421 B2 * | 10/2018 | Morris | H04L 43/0882 |
| 10,230,609 B2 * | 3/2019 | Chandrasekaran | H04L 47/28 |
| 10,243,785 B1 * | 3/2019 | Corrigan | H04L 41/0677 |
| 10,320,677 B2 * | 6/2019 | Caulfield | H04L 47/11 |
| 10,601,654 B2 * | 3/2020 | Srinivas | H04L 43/062 |
| 10,623,296 B2 * | 4/2020 | Haramaty | H04L 12/1886 |
| 10,666,541 B2 | 5/2020 | Gintis et al. | |
| 10,841,242 B2 * | 11/2020 | Zhou | H04L 43/08 |
| 10,862,771 B2 * | 12/2020 | Tomkins | H04L 69/22 |
| 10,873,529 B2 * | 12/2020 | Liu | H04L 47/25 |
| 10,992,568 B2 * | 4/2021 | Michael | H04L 47/125 |
| 10,999,251 B2 * | 5/2021 | Miriyala | H04L 47/20 |
| 11,033,906 B1 * | 6/2021 | Bingham | H04L 63/1425 |
| 11,328,222 B1 * | 5/2022 | Matthews | H04L 47/32 |
| 11,343,207 B1 * | 5/2022 | Evans | H04L 41/145 |
| 11,349,769 B1 * | 5/2022 | Yonai | H04L 47/2408 |
| 11,349,862 B2 * | 5/2022 | Key | H04L 63/20 |
| 11,374,858 B2 * | 6/2022 | Seshan | H04L 45/50 |
| 11,381,512 B1 * | 7/2022 | Kadosh | H04L 47/2483 |
| 11,388,081 B1 | 7/2022 | Sommers et al. | |
| 11,405,302 B1 | 8/2022 | Liu et al. | |
| 11,455,168 B1 * | 9/2022 | Potyraj | G06F 16/14 |
| 11,483,227 B2 | 10/2022 | Sommers | |
| 11,483,228 B2 | 10/2022 | Liu et al. | |
| 11,595,289 B2 * | 2/2023 | Lee | H04L 43/50 |
| 11,606,139 B2 * | 3/2023 | Perry | H04B 10/272 |
| 11,606,286 B2 * | 3/2023 | Michael | H04L 45/22 |
| 11,637,778 B2 * | 4/2023 | Muntz | H04L 49/254 |
| | | | 370/235 |
| 11,711,299 B2 * | 7/2023 | Ma | H04L 69/22 |
| | | | 370/392 |
| 11,722,360 B2 * | 8/2023 | Di Martino | H04L 43/50 |
| 11,729,087 B2 | 8/2023 | Bergeron et al. | |
| 11,743,189 B2 * | 8/2023 | Rosenberg | H04L 49/30 |
| 11,812,362 B2 * | 11/2023 | Grewal | H04L 45/586 |
| 11,838,151 B1 * | 12/2023 | Jones | H04L 25/0224 |
| 11,868,239 B1 * | 1/2024 | Gantt | G06F 11/3414 |
| 11,923,893 B2 * | 3/2024 | Perry | H04B 10/071 |
| 11,936,548 B2 * | 3/2024 | Wennerström | H04L 41/5019 |
| 12,058,015 B2 * | 8/2024 | Erickson | H04L 43/026 |
| 12,074,780 B2 * | 8/2024 | Ikäheimo | H04W 24/06 |
| 12,101,229 B2 * | 9/2024 | Kunimitsu | H04L 43/106 |
| 12,101,252 B2 | 9/2024 | Stan et al. | |
| 12,167,486 B2 * | 12/2024 | Moore | H04W 76/15 |
| 12,248,382 B2 * | 3/2025 | Halaharvi | G06F 11/0709 |
| 12,273,254 B2 * | 4/2025 | Venkatraman | H04L 45/02 |
| 12,273,270 B2 * | 4/2025 | Lee | H04L 47/115 |
| 12,287,724 B2 * | 4/2025 | Jebbar | G06F 11/302 |
| 12,294,470 B2 * | 5/2025 | Ruan | H04L 45/24 |
| 12,301,335 B2 * | 5/2025 | Choquette | H04B 7/18519 |
| 12,323,319 B2 * | 6/2025 | Yeh | H04L 69/24 |
| 12,341,687 B2 * | 6/2025 | Vegesna | H04L 45/42 |
| 2006/0002307 A1 | 1/2006 | Wang et al. | |
| 2006/0069544 A1 | 3/2006 | Liu et al. | |
| 2007/0195795 A1 | 8/2007 | Arai et al. | |
| 2007/0211640 A1 | 9/2007 | Palacharla et al. | |
| 2008/0291826 A1 | 11/2008 | Licardie et al. | |
| 2011/0069622 A1 | 3/2011 | Gintis et al. | |
| 2012/0051259 A1 | 3/2012 | Gintis et al. | |

| | | | |
|---|---|---|---|
| 2012/0051263 A1 | 3/2012 | Ozawa et al. | |
| 2013/0094357 A1 | 4/2013 | Sankar et al. | |
| 2014/0226457 A1 | 8/2014 | Hsueh et al. | |
| 2015/0023147 A1 | 1/2015 | Lee et al. | |
| 2015/0106669 A1 | 4/2015 | Gintis | |
| 2015/0156127 A1 | 6/2015 | Bello et al. | |
| 2016/0050156 A1 | 2/2016 | Bergeron | |
| 2016/0373362 A1 | 12/2016 | Cheng et al. | |
| 2018/0011955 A1 | 1/2018 | Gintis | |
| 2018/0019967 A1 * | 1/2018 | Ameling | H04L 12/4641 |
| 2018/0357108 A1 | 12/2018 | Mullender et al. | |
| 2020/0021497 A1 * | 1/2020 | Mathur | H04L 41/145 |
| 2020/0021510 A1 | 1/2020 | Gintis et al. | |
| 2020/0195553 A1 | 6/2020 | Yigit et al. | |
| 2020/0296026 A1 * | 9/2020 | Michael | H04L 45/12 |
| 2022/0046465 A1 * | 2/2022 | Zhang | H04L 43/16 |
| 2022/0247661 A1 | 8/2022 | Liu et al. | |
| 2022/0253324 A1 | 8/2022 | Liu et al. | |
| 2023/0038749 A1 * | 2/2023 | Bahadur | H04L 49/113 |
| 2023/0082606 A1 * | 3/2023 | Jebbar | G06F 11/3006 |
| | | | 714/38.1 |
| 2023/0171177 A9 | 6/2023 | Liu et al. | |
| 2023/0254259 A1 * | 8/2023 | Aravinthan | H04L 47/24 |
| | | | 370/230 |
| 2023/0319533 A1 * | 10/2023 | Ly | H04L 43/04 |
| | | | 709/224 |
| 2023/0409363 A1 * | 12/2023 | Shevade | G06F 8/65 |
| 2024/0073131 A1 | 2/2024 | Stan et al. | |
| 2024/0107364 A1 * | 3/2024 | Boryskin | H04L 41/147 |
| 2024/0160546 A1 * | 5/2024 | Mazile | G06F 11/2733 |
| 2024/0249219 A1 * | 7/2024 | Halaharvi | G06F 11/3672 |
| 2024/0340234 A1 * | 10/2024 | An | H04L 43/106 |

FOREIGN PATENT DOCUMENTS

| | | | | |
|---|---|---|---|---|
| EP | 1774726 B1 | 8/2013 | | |
| EP | 3627765 B1 * | 7/2025 | | H04L 43/20 |

OTHER PUBLICATIONS

"Systems and Methods for Providing Flexible Replay of a Network Test", IP.com, Pub. Id. IPCOM000270215D (Jun. 2022).

Office Action for Chinese Patent Application Serial No. 201910621331.X (Feb. 9, 2024).

"Traffic Generator Upgrade", CGS Tower Networks LTD, pp. 1-11 (2023).

Advisory Action and AFCP 2.0 Decision for U.S. Appl. No. 17/896,057 (Nov. 6, 2023).

Advisory Action and Examiner-Initiated Interview Summary for U.S. Appl. No. 17/896,057 (Oct. 11, 2023).

Zheng, et al., "Test and Evaluation of Wide Area Networks Using Emulator Cluster", IEEE International Conference on Communications, vol. 1, doi: 10.1109/ICC.2003.1204185, pp. 281-285 (2003).

Non-Final Office Action for U.S. Appl. No. 17/896,057 (Feb. 2, 2023).

Zhang et al. "Hashing Linearity Enables Relative Path Control in Data Centers," 2021 USENIX Annual Technical Conference, Jul. 14-16, 2021, pp. 565-579.

Commonly-Assigned, co=pending U.S. Appl. No. 17/896,057 for "Methods, Systems, and Computer Readable Media for Implementing Routing Path Groups Between Emulated Switches" (Unpublished, filed Aug. 25, 2022).

Notice of Allowance and Fee(s) Due and Examiner-Initiated Interview Summary for U.S. Appl. No. 16/033,144 (Jan. 21, 2020).

Non-Final Office Action for U.S. Appl. No. 16/033,144 (Sep. 25, 2019).

Commonly-Assigned, co-pending U.S. Appl. No. 16/033,144 for "Methods, Systems, and Computer Readable Media For Link Aggregation Group Switchover in a Network Testing Environment," (Unpublished, filed Jul. 11, 2018).

Notice of Allowance and Fee(s) Due and Examiner-Initiated Interview Summary for U.S. Appl. No. 14/460,340 (Aug. 26, 2016).

Applicant-Initiated Interview Summary for U.S. Appl. No. 14/460,340 (Jun. 17, 2016).

(56) References Cited

OTHER PUBLICATIONS

Non-Final Office Action for U.S. Appl. No. 14/460,340 (Mar. 21, 2016).

Krishnan, "Flow-aware Real-time SDN Analytics (FRSA)," http://blog.sflow.com/2014/02/flow-aware-real-time-sdn-analytics-frsa.html, pp. 1-12 (Feb. 5, 2014).

Systems and Methods for Dynamic Resource Allocation, Aggregation, and Compilation, IP.com Pub Id. IPCOM000266296D, Jul. 2021.

Link Aggregation Support for DataPlane Traffic Generation, IP.com Pub Id. IPCOM000271634D, Feb. 2023,.

"Network Traffic Manipulation and Visualization Via Digital Audio Workstation (DAW) Paradigm", IP.com, Pub. Id. IPCOM000267303D (Oct. 2021).

Commonly-Assigned, co-pending U.S. Appl. No. 17/498,723 for "Methods, Systems, and Computer Readable Media for Recycling Background Traffic in a Test Environment" (Unpublished, filed Oct. 11, 2021).

"Systems and Methods for Demonstrating Network Visibility Tool Performance", IP.com, Pub. Id. IPCOM000267564D (Nov. 2021).

"Systems and Methods for Emulating Link Flapping in a Datacenter Fabric", IP.com, Pub. Id., IPCOM000267776D (Dec. 2021).

"Datacenter Emulator as a SmartNIC/DASH Test Platform", IP.com, Pub. Id. IPCOM000269877D (Jun. 2022).

"Systems and Methods for Testing and Analyzing TCP Behavior in a Data Center", IP.com, Pub. Id., IPCOM000270660D (Aug. 2022).

"Systems and Methods for Testing and Analyzing TCP Behavior Via SmartNIC Offloading", IP.com, Pub. Id. PCOM000270659D (Aug. 2022).

Commonly-Assigned, co-pending U.S. Appl. No. 17/860,932 for "Methods, Systems, and Computer Readable Media for Capturing Dropped Packets at a Switching Fabric Emulator", (Unpublished, filed Jul. 8, 2022).

"Systems and Methods for Providing Concurrent Switch Fabric Emulations on a Single Hardware Device", IP.com, Pub Id. IPCOM000270216D (Jun. 2022).

Commonly-Assigned, co-pending U.S. Appl. No. 17/841,629 for "Methods, Systems, and Computer Readable Media for Processing Control Plane Messages for Emulated Data Center Switching Fabric" (Unpublished, filed Jun. 15, 2022).

Search Report for GB Patent Application Serial No. 2312755.8 (Feb. 13, 2024).

Sancho, et al., "Analyzing the Influence of Virtual Lanes on the Performance of Infiniband Networks", Proceedings 16th International Parallel and Distributed Processing Symposium, Ft Lauderdale, FL, USA, 2002, pp. 10, doi: 10.1109/IPDPS.2002.1016568. (Year 2002).

Moraes, et al., "Efficient Virtual Network Isolation in Multi-Tenant Data Centers on Commodity Ethernet Switches", 2016 IFIP Networking Conference (IFIP Networking) and Workshops, Vienna, Austria, 2016, pp. 100-108, doi:10.1109/IFIPNetworking.2016. 7497251. (Year: 2016).

Final Office Action for U.S. Appl. No. 17/896,057 (Jul. 21, 2023).

* cited by examiner

300

| RULE ID | MATCH CRITERIA | PRE-FORWARDING ACTION(S) | FORWARDING PORT (E.G., EGRESS PORT) |
|---|---|---|---|
| 1 (E.G., FOR F1 & F3) | DESTINATION IP/MAC ADDRESS 'A' | ADD ERI IF NEEDED USING ADDRESS-PORT (TG) MAPPING | B1 |
| 2 (E.G., FOR B1) | DESTINATION MAC ADDRESS [EMBEDDED ROUTING INFO STORED THEREIN] / OTHER ERI LOCATION | REMOVE ERI / REPLACE WITH OTHER DATA | F1 OR F3 AS INDICATED BY ERI |
| 3 (E.G., FOR F5 & F7) | DESTINATION IP/MAC ADDRESS 'B' | ADD ERI IF NEEDED USING ADDRESS-PORT (TG) MAPPING | B6 |
| 4 (E.G., FOR B6 & B7) | DESTINATION MAC ADDRESS [EMBEDDED ROUTING INFO STORED THEREIN] / OTHER ERI LOCATION | REMOVE ERI / REPLACE WITH OTHER DATA | F5 OR F7 AS INDICATED BY ERI |
| 5 (E.G., FOR F5 & F7) | DESTINATION IP/MAC ADDRESS 'C' | ADD ERI IF NEEDED USING ADDRESS-PORT (TG) MAPPING | B7 |

| RULE ID | MATCH CRITERIA | PRE-FORWARDING ACTION(S) | FORWARDING PORT (E.G., EGRESS PORT) |
|---|---|---|---|
| 1 (E.G., FOR F2 & F6) | DESTINATION IP/MAC ADDRESS 'A' | ADD AGID IF NEEDED USING ADDRESS-PORT (TG) MAPPING | B1 |
| 2 (E.G., FOR B1) | AGGREGATION ID (AGID) (E.G., PFC PARAMETER VALUE) | REMOVE OR REPLACE AGID OR RELATED DATA | F2 OR F6 (INDICATED BY AGID) |
| 3 (E.G., FOR F2 & F6) | DESTINATION IP/MAC ADDRESS 'B' | ADD AGID IF NEEDED USING ADDRESS-PORT (TG) MAPPING | B6 |
| 4 (E.G., FOR B6) | AGGREGATION ID (AGID) (E.G., PFC PARAMETER VALUE) | REMOVE OR REPLACE AGID OR RELATED DATA | F2 OR F6 (INDICATED BY AGID) |
| 5 (E.G., FOR F2 & F6) | DESTINATION IP/MAC ADDRESS 'C' | ADD AGID IF NEEDED USING ADDRESS-PORT (TG) MAPPING | B7 |
| 6 (E.G., FOR B7) | AGGREGATION ID (AGID) (E.G., PFC PARAMETER VALUE) | REMOVE OR REPLACE AGID OR RELATED DATA | F2 OR F6 (INDICATED BY AGID) |

| MATCH CRITERIA | REPLACEMENT DATA |
|---|---|
| 00-B0-D0-6*-C2-26 | A |
| 02-A2-D0-8*-B3-31 | 2 |
| 3A-B0-C4-2*-C7-A1 | B |
| 12-C3-A2-D*-3D-B5 | 7 |
| 175.45.23.* | 15 |
| 214.48.34.* | 0 |
| 15.185.79.* | 23 |
| 84.181.104.6* | 6 |

FIG. 6

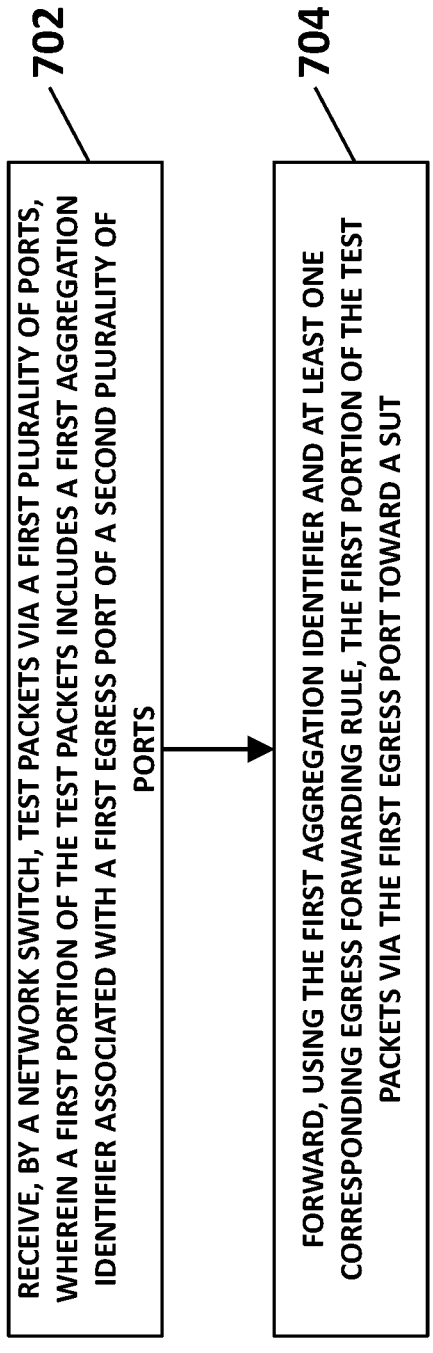

700

702

RECEIVE, BY A NETWORK SWITCH, TEST PACKETS VIA A FIRST PLURALITY OF PORTS, WHEREIN A FIRST PORTION OF THE TEST PACKETS INCLUDES A FIRST AGGREGATION IDENTIFIER ASSOCIATED WITH A FIRST EGRESS PORT OF A SECOND PLURALITY OF PORTS

704

FORWARD, USING THE FIRST AGGREGATION IDENTIFIER AND AT LEAST ONE CORRESPONDING EGRESS FORWARDING RULE, THE FIRST PORTION OF THE TEST PACKETS VIA THE FIRST EGRESS PORT TOWARD A SUT

FIG. 7

METHODS, SYSTEMS, AND COMPUTER READABLE MEDIA FOR LINK MULTIPLEXING AND FORWARDING PACKETS IN A TEST ENVIRONMENT

CROSS-REFERENCE TO RELATED APPLICATIONS

This application claims the priority benefit of Romanian Patent Application No. a 2023 00190, entitled, "METHODS, SYSTEMS, AND COMPUTER READABLE MEDIA FOR LINK MULTIPLEXING AND FORWARDING PACKETS IN A TEST ENVIRONMENT" and filed on Apr. 18, 2023, the disclosure of which is incorporated herein by reference in its entirety.

TECHNICAL FIELD

The subject matter described herein relates to testing network elements. More specifically, the subject matter relates to methods, systems, and computer readable media for link multiplexing and forwarding packets in a test environment.

BACKGROUND

When testing networks with real-world workloads or performing stress testing on one or more entities thereof, a network test system may need to generate and send a large amount of test traffic. To achieve a high throughput, a network test system may use multiple traffic generators (e.g., independent packet generating devices or units) for generating test packets. For some test scenarios, a network test system may need to aggregate packets from multiple traffic generators such that the test packets are transmitted over the same link or appears to come from the same source. While a packet forwarding device, e.g., a network switch, may be used for aggregating test traffic from multiple traffic generators, issues can arise with regard to efficiently and effectively aggregating the packets and forwarding the packets to a system under test (SUT) via the packet forwarding device. One potential issue involves how to effectively and/or efficiently aggregate test packets and control or modify the packet aggregation during a test session. Another potential issue involves routing or forwarding test packet responses to the originating traffic generator of the corresponding test packets, especially when the test packet responses are received via multiple ports, including one or more ports different from the port that sent the test packets.

SUMMARY

Methods, systems, and computer readable media for link multiplexing and forwarding packets in a test environment are disclosed. One example method occurs at a network switch comprising a first plurality of ports and a second plurality of ports, wherein each of the first plurality of ports is connected to one of a plurality of traffic generators and each of the second plurality of ports is connected to a system under test (SUT). The method comprises receiving, by the network switch, test packets via the first plurality of ports, wherein a first portion of the test packets includes a first aggregation identifier associated with a first egress port of the second plurality of ports; and forwarding, using the first aggregation identifier and at least one corresponding egress forwarding rule, the first portion of the test packets via the first egress port toward the SUT.

According to one example system for link multiplexing and forwarding packets in a test environment, the test system comprises a network switch comprising a first plurality of ports and a second plurality of ports, wherein each of the ingress ports is connected to one of a plurality of traffic generators and each of the second plurality of ports is connected to a SUT, where the network switch is configured for: receiving, by the network switch, test packets via the first plurality of ports, wherein a first portion of the test packets includes a first aggregation identifier associated with a first egress port of the second plurality of ports; and forwarding, using the first aggregation identifier and at least one corresponding egress forwarding rule, the first portion of the test packets via the first egress port toward the SUT.

The subject matter described herein may be implemented in software in combination with hardware and/or firmware. For example, the subject matter described herein may be implemented in software executed by a processor (e.g., a hardware-based processor). In one example implementation, the subject matter described herein may be implemented using a non-transitory computer readable medium having stored thereon computer executable instructions that when executed by the processor of a computer control the computer to perform steps. Example computer readable media suitable for implementing the subject matter described herein include non-transitory devices, such as disk memory devices, chip memory devices, programmable logic devices, such as field programmable gate arrays, and application specific integrated circuits. In addition, a computer readable medium that implements the subject matter described herein may be located on a single device or computing platform or may be distributed across multiple devices or computing platforms.

As used herein, the term "node" refers to at least one physical computing platform including one or more processors and memory.

As used herein, the terms "function" or "module" refer to software in combination with hardware and/or firmware for implementing features described herein. In some embodiments, a module may include a field-programmable gateway array (FPGA), an application-specific integrated circuit (ASIC), or a processor.

BRIEF DESCRIPTION OF THE DRAWINGS

The subject matter described herein will now be explained with reference to the accompanying drawings of which:

FIG. 3 is a diagram illustrating example forwarding rule data usable for directing or causing traffic to be sent or forwarded via one or more port(s);

FIG. 5 is a diagram illustrating other example forwarding rule data usable for directing or causing traffic to be sent or forwarded via one or more port(s);

FIG. 6 is a diagram illustrating example replacement rule data usable for replacing aggregation identifiers or embedded routing information with replacement data; and FIG. 7 is a block diagram illustrating an example process for link multiplexing and forwarding packets in a test environment.

DETAILED DESCRIPTION

Figure 1:
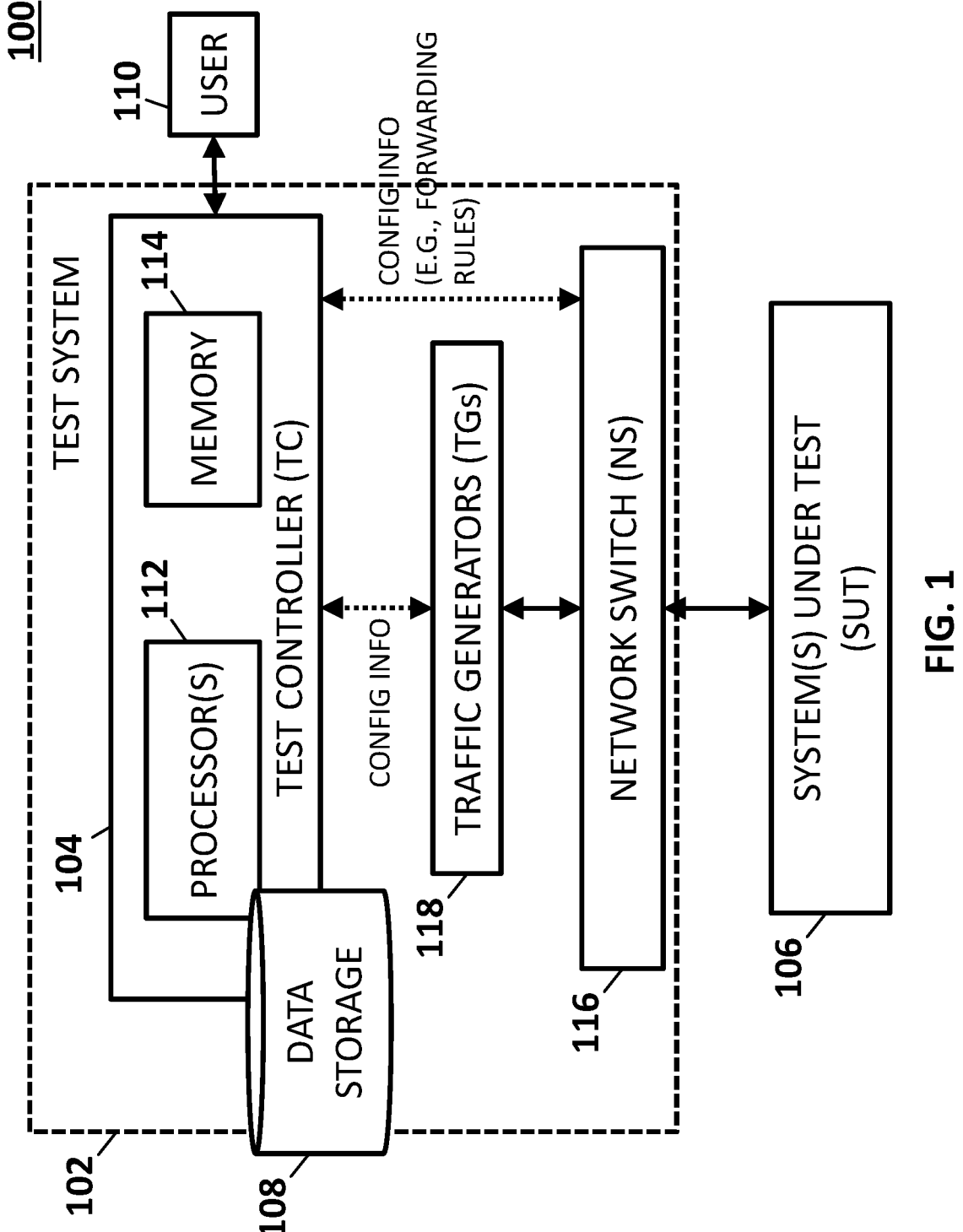
FIG. 1 is a diagram illustrating an example test environment for link multiplexing and forwarding packets.

The subject matter described herein relates to methods, systems, and computer readable media for link multiplexing and forwarding packets in a test environment. For example, a network test system in accordance with aspects described herein may utilize multiple independent, centrally config-ured traffic generators whose output (e.g., network packets) can be aggregated by a network switch. In this example, by using the network switch as a packet aggregator, a system under test (SUT) may see the aggregated traffic as coming from a single source or link. Further, by using multiple traffic generators and the network switch as a packet aggregator, the network test system may be able to use to test the SUT with high packet throughput.

In accordance with some aspects of the subject matter described herein, techniques, methods, equipment, systems, and/or mechanisms are disclosed for link multiplexing and forwarding packets in a test environment. For example, a test system or a related entity may configure or instruct traffic generators to insert or add aggregation identifiers (AGIDs) or embedded routing information (ERI) values into test packets for egress routing, link multiplexing, congestion mitigation, or other purposes. In some examples, AGIDs may represent any suitable information usable for routing or forwarding packets via a particular egress port, e.g., for-warding port, of a network switch (e.g., an AGID may be a priority value or integer that uniquely identifies an egress port of network switch and may be stored as a priority-based flow control (PFC) value in a virtual local area network (VLAN tag)). In some examples, an AGID may be referred to as an ERI value when an egress port identifier or related information is in a packet portion (e.g., a packet header or payload portion) repurposed for storing an AGID (e.g., an ERI value may supplant the original third byte of a header parameter value, such as a destination internet protocol (IP) address parameter value).

In accordance with some aspects of the subject matter described herein, a network switch or an entity thereof (e.g., a switch processor) may receive forwarding rules or other logic for utilizing AGIDs or ERI when routing or forwarding packets in a test environment. For example, for each AGID used by traffic generators in a test session, a test system or a related entity may generate and provide a set of forwarding rules for installation at or on a receiving network switch. In this example, each set of forwarding rules may include at least one egress forwarding rule for forwarding packets from a particular traffic generator to a SUT via an appropriate forwarding port of the network switch (e.g., a front-panel port at the network switch connecting the network switch and the SUT) and at least one ingress forwarding rule for forwarding packets from the SUT to a particular traffic generator via an appropriate forwarding port of the network switch (e.g., a back-panel port at the network switch con-necting the network switch and the traffic generator).

Reference will now be made in detail to exemplary embodiments of the subject matter described herein, examples of which are illustrated in the accompanying drawings. Wherever possible, the same reference numbers will be used throughout the drawings to refer to the same or like parts.

FIG. 1 is a diagram illustrating an example test environ-ment 100 for link multiplexing and forwarding packets.

Referring to FIG. 1, test environment 100 may include test system 102 and one or more device(s) and/or system(s) under test (SUT) 106. Test system 102 may represent any suitable entity or entities (e.g., one or more computing platforms, nodes, or devices) associated with testing SUT 106 (e.g., one or more networks or devices). For example, test system 102 may generate and send traffic to SUT 106 and/or receive traffic from SUT 106 and may analyze one or more aspects associated with SUT 106.

In some embodiments, test system 102 may be a stand-alone tool, a testing device, or software executing on one or more processor(s) 112. In some embodiments, test system 102 may be a single device or node or may be distributed across multiple devices or nodes. In some embodiments, test system 102 may include one or more modules for perform-ing various test related functions. For example, test system 102 may include an emulation module for emulating one or more nodes or devices that communicates with SUT 106.

In some embodiments, test system 102 may include a test controller (TC) 104, a network switch (NS) 116, traffic generator (TGs) 118, and a data storage 108. TC 104 may be any suitable entity or entities (e.g., software executing on a processor, an application-specific integrated circuit (ASIC), a field-programmable gateway array (FPGA), or a combi-nation of software, an ASIC, or an FPGA) for performing one or more aspects associated with testing SUT 106 and/or various aspects thereof. In some embodiments, TC 104 may be implemented using processor(s) 112 and/or memory 114. Processor(s) 112 may represent or include a physical pro-cessor, a general purpose microprocessor, a single-core processor, a multi-core processor, an FPGA, and/or an ASIC for executing software and/or logic stored in memory 114. Memory 114 may represent one or more computer readable media for storing data, logic, software, or other information.

In some embodiments, TC 104 may include one or more communications interfaces, e.g., one or more network inter-face cards (NICs), for interacting with users, modules, and/or nodes. For example, TC 104 may use one or more communications interfaces for receiving various messages and one or more communications interfaces for sending various messages. In this example, some of the communi-cations interfaces support automation e.g., via one or more programming languages (e.g., python, PHP, etc.), a repre-sentation state transfer (REST) API, a command line, and/or a web based GUI.

In some embodiments, TC 104 may include or provide a communications interface for communicating with user 110. User 110 may be any entity (e.g., an automated system or a device or system controlled or controllable by a human user) for selecting and/or configuring various aspects associated with testing SUT 106 and/or generating testing related metrics. For example, various user interfaces (e.g., an appli-cation user interface (API) and a graphical user interface (GUI)) may be provided for receiving user input or test configuration information, such as tests to be performed, types of metrics or statistics to be generated, a number of test messages per port or stream to be generated, and/or other settings.

In some embodiments, TC 104 may include one or more communications interfaces for interacting with test related entities, e.g., TGs 118 and NS 116. For example, TC 104 may utilize communications interfaces for sending configu-ration information to TGs 118 and/or NS 116 for configuring or setting up a test session or a related test scenario. In this example, configuration information for TGs 118 may indi-cate what type or amount of test traffic is to be generated, what content to include (e.g., parameter values, sequence numbers, predetermined responses, etc.), and/or percentages of generated packets or flows. Continuing with this example, configuration information for NS 116 may indicate how different traffic flows (e.g., related test packets and responses) are going to be forwarded or otherwise processed.

In some embodiments, TC 104 or another entity may provide TGs 118 with information for including various aggregation identifiers (AGIDs) or embedded routing information (ERI) values in test packets for egress routing, link multiplexing, congestion mitigation, or other purposes. Each AGIDs may represent any suitable information (e.g., a priority value or integer that uniquely identifies an egress port and may be stored as a priority-based flow control (PFC) value in a virtual local area network (VLAN tag)) usable for routing or forwarding packets via a particular egress port, e.g., forwarding port.

In some embodiments, an AGID may include ERI, e.g., any suitable information (e.g., a number or value uniquely associated with an egress port usable for indicating an egress or forwarding port and located in a packet portion (e.g., a 4-bit portion of a header parameter value) that is repurposed or not being used for its intended purposes. In some embodiments, an AGID may be considered ERI when the AGID is located in a preexisting packet portion (e.g., where the port identifier overwrites or supplants bits of a mandatory header parameter value) or when the AGID does not increase overhead.

In some embodiments, TC 104 or another entity may provide NS 116 appropriate packet forwarding rules (e.g., ingress forwarding rules for packets from SUT 106 destined for TGs 118 and egress forwarding rules for packets from TGs 118 destined for SUT 106) for forwarding test related packets using an AGID or ERI therein. For example, after configuring test environment 100 where TGs 118 will generate test packets for three different virtual links or forwarding ports and each virtual link or forwarding port is represented by a unique AGID in the test packet, a set of forwarding rules for each AGID may be provided and installed at or on NS 116. In this example, each set of forwarding rules may include at least one ingress forwarding rule for forwarding packets from SUT 106 destined for TGs 118 and at least one egress forwarding rule for forwarding packets from TGs 118 destined for SUT 106.

In some embodiments, using configuration information provided by TC 104 or another entity, each of TGs 118 may generate configurable amounts of test packets comprising particular AGIDs or ERI values and send the test packets to NS 116 via a physical port. In this example, AGIDs or ERI values in received test packets may be usable by NS 116 (e.g., via installed forwarding rules provided by TC 104 or another entity (e.g., TGs 118)) for determining appropriate egress port(s) for forwarding the test packets to SUT 106.

In some embodiments, TC 104 may include functionality for accessing data storage 108 or memory 114. Data storage 108 may be any suitable entity or entities (e.g., a storage device, memory 114, a non-transitory computer readable medium, or a storage system) for maintaining or storing information related to testing. For example, data storage 108 may store forwarding rule data, test packet and flow template data, network topology information (e.g., port and/or connection information about various test related entities), test results or performance information, and/or other information. In some embodiments, data storage 108 and/or memory 114 may be located at test system 102, another node, or distributed across multiple platforms or devices.

In some embodiments, data storage 108 may include information usable for generating statistics and/or metrics associated with one or more aspects of SUT 106. For example, data storage 108 may contain metrics associated with one or more performance aspects of SUT 106 during one or more test scenarios. In this example, data storage 108 may maintain a particular set of computed metrics for a first traffic flow (e.g., packets comprising an AGID '1') and may maintain another set of computed metrics for a second traffic flow (e.g., packets comprising an AGID '2').

In some embodiments, data storage 108 may include information about test environment 100 including network topology information indicating which ports or links connect various test related entities (e.g., ports or links between TGs 118 and NS 116 and ports or links between NS 116 and SUT 106). In such embodiments, such information may be usable when generating configuration instructions for TGs 118 and NS 116, e.g., forwarding rules may utilize known port information to make sure that test packets that utilize AGIDs, ERI, or related information are sent to SUT 106 via appropriate forwarding ports.

Each of TGs 118 may be any suitable entity or entities (e.g., software executing on a processor, an ASIC, an FPGA, or a combination of software, an ASIC, or an FPGA) for performing one or more aspects associated with generating or synthesizing test sessions, test cases, or related test packets. For example, TGs 118 may receive configuration instructions (e.g., test traffic templates and/or related data) from TC 104, local data storage, or another source. In this example, TGs 118 may use the instructions to generate test traffic associated with a test session or related scenario.

In some embodiments, each of TGs 118 may be connected to NS 116 via a physical port (e.g., a back-panel port) and may send test packets comprising different AGIDs or ERI values for indicating to NS 116 which egress port (e.g., a front-panel port) to forward or route the test packets to SUT 106.

NS 116 may represent any suitable entity (e.g., a network router, a packet forwarding device, an aggregation system, a device, or a security appliance, etc.) for forwarding or routing packets, e.g., performing switching functions or various other processing functions. In some embodiments, NS 116 may include one or more physical ports (e.g., back-panel ports) for communicating with TGs 118 and one or more physical ports (e.g., front-panel ports) for communicating with SUT 106.

In some embodiments, NS 116 may include one or more programming ASICs or processors that can be configured or programmed by a test related entity (e.g., TC 104) to process test packets or related responses. For example, NS 116 may include a P4 programmable switching ASIC that can execute a P4 script or application. In this example, the P4 programmable switch ASIC may receive configuration information, e.g., P4 instructions and forwarding rules, from TC 104 or another entity for controlling a data plane (e.g., data packet processing).

In some embodiments, NS 116 or entities thereof (e.g., port processors or ASICs) may be configured to aggregate and send test packets to SUT 106 using AGIDs or ERI values in the test packets. For example, TC 104 or another entity may generate or provide egress and ingress forwarding rules for installation at NS 116. In this example, each egress forwarding rule may indicate which front-panel port is to transmit or forward test packets (e.g., generated by TGs 118) to SUT 106 as indicated by an AGID in the test packets and ingress forwarding rules may indicate which back-panel port is to transmit or forward responses to test packets (e.g., from SUT 106) to TGs 118. In some embodiments, e.g., when utilizing forwarding rules to forward packets back to TGs 118, NS 116 or entities thereof (e.g., port processors or ASICs) may lookup or query, using packet data, a data store comprising associations between packet data (e.g., a source and/or destination network address or other identifier) and an AGID or egress port.

In some embodiments, NS 116 or entities thereof (e.g., port processors or ASICs) may be configured to utilize AGIDs or ERI values to mitigate congestion. For example, where test environment 100 utilizes a priority-based flow control (PFC) mechanism (e.g., as defined in IEEE 802.1Qbb) and where AGIDs are stored as PFC values in packets' VLAN tags, NS 116 or another entity may send a pause message for packets having a particular PFC value, thereby pausing or stopping a particular test flow (e.g., packets that include that PFC value) without affecting other test flows.

SUT 106 may be any suitable entity or entities (e.g., devices, systems, or platforms) for communicating with test system 102 or related entities and/or receiving, processing, forwarding, and/or sending test traffic, non-test traffic, or other data. For example, SUT 106 may include a network router, a network switch, a network device, a server, or a network controller. In another example, SUT 106 may include one or more systems and/or computing platforms, e.g., a data center or a group of servers and/or switches connected via a network. In yet another example, SUT 106 may include one or more networks or related components, e.g., a converged Ethernet network, an access network, a core network, or the Internet.

It will be appreciated that FIG. 1 is for illustrative purposes and that various nodes and/or modules, locations, and/or functionality described above in relation to FIG. 1 may be changed, altered, added, or removed.

Figure 2:
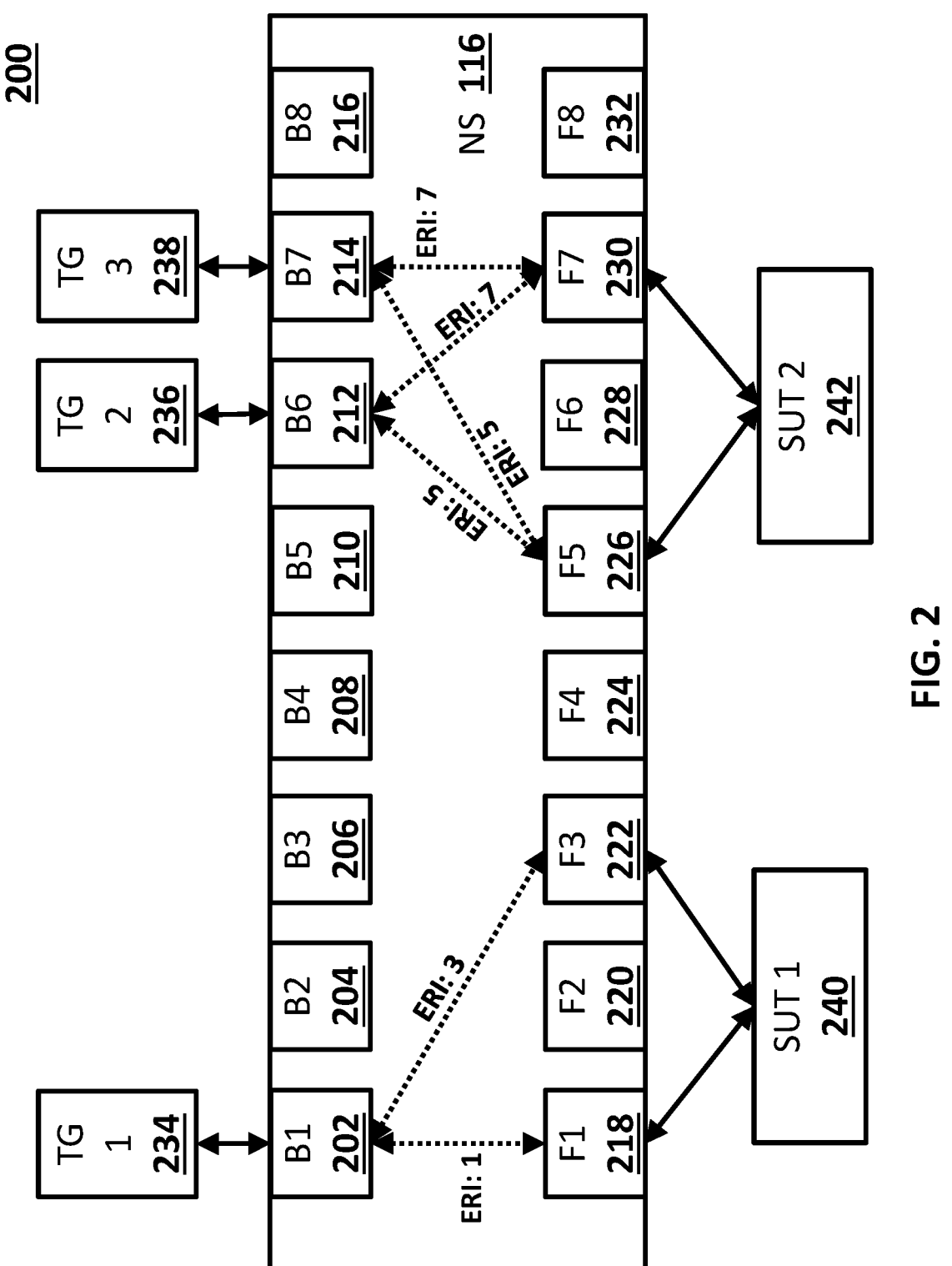
FIG. 2 is a diagram illustrating an example test scenario where traffic generators generate test packets that egress a network switch via one or more ports.

FIG. 2 is a diagram illustrating an example test scenario 200 where TGs 234-238 generate test packets that egress a network switch via one or more ports. For example, scenario 200 may include a plurality of TGs 234-238 respectively connected to NS 116 via physical ports 202, 212, and 214, where NS 116 is also connected to SUT 240 via physical ports 218 and 222 and connected to SUT 242 via physical ports 226 and 230. Each of TGs 234-238 may include the same or similar functionality described above with regard to TGs 118. Each of SUTs 240 and 242 may include the same or similar functionality described above with regard to SUT 106.

In some embodiments, test system 102 or a related entity (e.g., TC 104) may provide TGs 118 with information for including AGIDs as ERI in test packets. For example, an AGID stored as ERI may include any suitable information (e.g., a number or value uniquely associated with an egress port usable for indicating an egress or forwarding port and may be located in a preexisting packet portion (e.g., a 4-bit portion of a header parameter value) that is repurposed for storing AGIDs or not being used for its intended purposes.

In some embodiments, scenario 200 may include testing SUTs 240 and 242 using test traffic generated by TGs 234-238 and forwarded and/or aggregated by NS 116. For example, each of TGs 234-238 may be a separate or distinct device and may be configured to generate test packets that include AGIDs as ERI (e.g., a 4-bit portion of a destination media access control (MAC) address parameter value). In this example, the test packets may be sent to NS 116 via a respective back-panel port (e.g., one of ports 202, 212, and 214) and then NS 116 using the AGIDs and forwarding rules or related logic may forward the test packets via appropriate front-panel port(s) (e.g., one of ports 218, 222, 226, and 230).

In some embodiments, each AGID may correspond to a unique front-panel port (e.g., one of ports 218, 222, 226, and 230). For example, as depicted in FIG. 2, test packets comprising an AGID or ERI of '1' may be forward via port 218; test packets comprising an AGID or ERI of '3' may be forward via port 222; test packets comprising an AGID or ERI of '5' may be forward via port 226; and test packets comprising an AGID or ERI of '7' may be forward via port 230.

In some embodiments, by embedding AGIDs in existing packet portions, various advantages may exist over other techniques. For example, if TGs 234-238 were configured to insert VLAN tags corresponding to egress ports and NS 116 was configured to use a VLAN tagging technique for forwarding test packets via appropriate egress ports, then such a solution adds a four byte overhead to each frame, thereby reducing packet throughput of test system 102. In another example, where NS 116 is configured to perform layer 2 or layer 3 addressed based switching, NS 116 may require a potentially large and burdensome number of forwarding rules (e.g., since the number rules increase linearly with the number of network addresses being used and TGs 234-238 may be configured to generate hundreds, thousands, or millions of network addresses for test packets when testing). In this example, depending on the number of addresses being used, memory requirements can exceed available resources and, further, setting up and tearing down numerous forwarding rules can add additional complexity.

In some embodiments, e.g., to implement an ERI-based solution that adds minimal overhead, AGIDs may be stored in a preexisting packet portion (e.g., a range of bits within a packet header or parameter value thereof) and may indicate a port identifier indicating an egress port (e.g., a forwarding port, such as a front-panel port connecting SUT 240 or 242).

In some embodiments, e.g., to minimize overhead and/or to maintain forwarding speed and efficiency, the number of bits used to store or represent an AGID may be proportional to the number of usable egress or forwarding ports (e.g., front-panel ports or ports 218-232) at NS 116. For example, as depicted in FIG. 2, there are eight front-panel ports facing SUTs 240 and 242 and, as such, the bit size of an AGID may be three bits since three bits can represent eight different values, e.g., an integer between 0 and 7. In another example, where there are 16 possible egress ports, the bit size of an AGID may be four bits since four bits can represent 16 different values, e.g., an integer between 0 and 15.

In some embodiments, NS 116 or entities thereof (e.g., ports 202-232 or related port processors) may be configured to inspect received packets for AGIDs and use corresponding forwarding rules to forward packets via appropriate egress ports. For example, via configuration settings or forwarding rules, TC 104 or another entity may configure NS 116 or an entity thereof to know the location of an AGID or ERI in test packets (e.g., the last 4 bits of the 4th byte of a destination MAC address parameter value or another parameter value). In this example, for a given test packet, NS 116 or an entity thereof may query a set of installed forwarding rules using the AGID as match criteria to determine how to forward the corresponding packet.

In some embodiments, NS 116 or entities thereof (e.g., ports 202-232 or related port processors) may be configured to modify packets using forwarding rules or other information, e.g., prior to forwarding them. For example, when a test packet is received at port 202 from TG 234 and after an egress port 218 is determined using an ERI value, NS 116 or an entity thereof may remove or replace the AGID prior to forwarding the test packet onward to SUT 240 via port 218. In some embodiments, removing or replacing the ERI may include zeroing out the ERI or replacing it with some predetermined data. In some embodiments, replacing the ERI may involve querying or accessing a data store for appropriate replacement data.

Additional details regarding ERI-related forwarding rules and related usage are described below with regard to FIG. 3.

It will be appreciated that FIG. 2 is for illustrative purposes and that various depicted entities, their locations, and/or their functions described above in relation to FIG. 2 may be changed, altered, added, or removed.

FIG. 3 illustrates example forwarding rule data 300 usable for directing or causing traffic to be sent or forwarded via one or more port(s) (e.g., one of ports 202-232) and may also include or indicate relevant pre-forwarding actions. For example, data 300 may include identifiers, match criteria, instructions, commands, or executables usable by NS 116 or another entity (e.g., a switch processor or a port processor therein) for identifying relevant packets that need pre-forwarding processing (e.g., removing or replacing ERI) and, after processing, sending the packets to a destination (e.g., SUT 240 or 242) via an appropriate forwarding port (e.g., one of egress ports 202-232).

In some embodiments, data 300 or portions or variations thereof may be accessed and/or stored by NS 116, ports 202-232, and/or other entities using one or more data structures or storage devices (e.g., memory on or accessible to NS 116 or ports thereof).

Referring to FIG. 3, forwarding rule data 300 may be depicted using a table representing various forwarding rules, e.g., ingress rules for handling received test packets (e.g., from TGs 118) or responses thereof (e.g., from SUT 106) and egress rules for handling test packets that are to be transmitted (e.g., to SUT 106). For example, each table row depicted in FIG. 3 may represent an ingress or egress forwarding rule indicating a rule identifier for the rule, match criteria for identifying packets associated with the rule, pre-forwarding action(s) to perform on the packets associated with the rule, and a forwarding port for transmitting the packets associated with the rule.

In some embodiments, a rule identifier may include any suitable information for identifying a forwarding rule. For example, a rule identifier may be a value (e.g., an alphanumeric value, an integer, or a letter) that uniquely identifies a forwarding rule. In another example, a rule identifier may also indicate a direction (e.g., ingress or egress) or a port where the rule is deployed or utilized, e.g., front-panel ports or back-panel ports.

In some embodiments, match criteria may include any suitable information (e.g., a regular expression, a string of characters including wildcards, etc.) for identifying packets to be forwarded using an associated forwarding rule. For example, NS 116 or an entity thereof (e.g., a switch or port processor) may be configured to compare a parameter value including ERI with match criteria to determine which, if any, forwarding rules match. In this example, NS 116 or an entity thereof may know which parameter to compare (e.g., which parameter includes the ERI), e.g., based on rule metadata, test settings, or a network operator (e.g., user 110).

In some embodiments, pre-forwarding action(s) may include any suitable information (e.g., action identifiers, instructions, scripts, commands, etc.) for identifying one or more pre-forwarding actions to be performed on a packet associated with a forwarding rule.

In some embodiments, pre-forwarding action(s) may depend on the type of forwarding rules, test settings, and/or NS and TG configuration. For example, after a received packet from SUT 240 destined for TG 236 matches an ingress forwarding rule (e.g., rule '1' of data 300), NS 116 or an entity thereof (e.g., a switch processor or a port processor of port 220) may add ERI (e.g., a port identifier or TG identifying information) to the received packet such that the received packet can be forwarded or routed to the TG that generated the test packet associated with the received packet. In this example, NS 116 or an entity thereof (e.g., a switch or port processor) may access an address-to-port (or TG) data store for identifying the ERI. In another example, e.g., where no additional routing information is needed after a first forwarding rule is processed, NS 116 or an entity thereof (e.g., a switch or port processor) may not add ERI (e.g., pre-forwarding actions may not be needed or performed).

In another example, prior to a packet from TG 234 being sent to SUT 240, the packet to be transmitted may match an egress forwarding rule (e.g., rule '2' of data 300). In this example, NS 116 or an entity thereof (e.g., a switch processor or a port processor of port 202) may perform a pre-forwarding action involving modifying the packet to remove or replace ERI (e.g., a byte in a destination IP address, a digit in a destination MAC address, etc.). In some embodiments, removing or replacing the ERI may include zeroing out the ERI or replacing it with some predetermined data. In some embodiments, replacing the ERI may involve querying or accessing a data store for appropriate replacement data. An example replacement scenario is described below with regard to FIG. 6.

In some embodiments, a forwarding port may include any suitable information (e.g., a port identifier, a value, a hexadecimal digit, etc.) for identifying a port for forwarding an associated packet. For example, a forwarding port portion of a forwarding rule may be static (e.g., port 202). In another example, a forwarding port portion of a forwarding rule may indicate that the forwarding port is determinable using an ERI located in the packet or a parameter value thereof. In this example, NS 116 or an entity thereof (e.g., a switch or port processor) may identify the forwarding port using the ERI and an ERI-to-port identifier data store.

It will be appreciated that data 300 in FIG. 3 is for illustrative purposes and that different and/or additional information may also be stored or maintained. Further, it will be appreciated that data 300 or related data may be stored in various data structures, memories, media, and/or in one or more locations.

Figure 4:
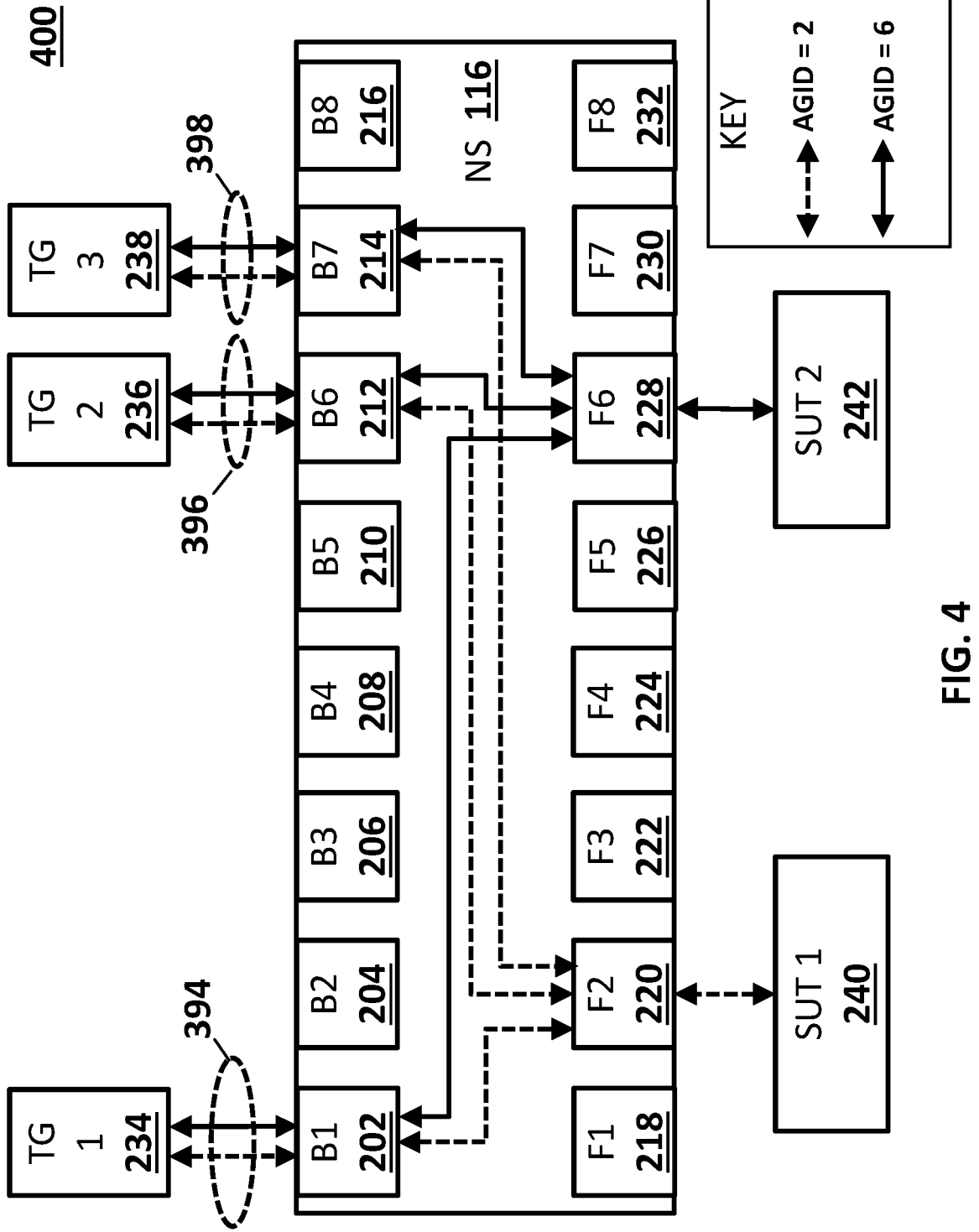
FIG. 4 is a diagram illustrating an example test scenario where each traffic generator generates test packets for multiple links.

FIG. 4 is a diagram illustrating an example test scenario 400 where TGs 234-238 generate test packets for multiple virtual links. Scenario 400 may include a plurality of TGs 234-238 respectively connected to NS 116 via physical ports 202, 212, and 214, where NS 116 is also connected to SUTs 240 and 242 via physical ports 220 and 228, respectively. Each of TGs 234-238 may include the same or similar functionality described above with regard to TGs 118. Each of aggregate links 394-398 may represent a physical link (e.g., a fiber cable or high-speed cable) connected to a physical port (e.g., a back-panel port such as port 202, 212, or 214) of NS 116 and may include a plurality of virtual links. Each of SUTs 240 and 242 may include the same or similar functionality described above with regard to SUT 106.

In some embodiments, NS 116 may include a first plurality of ports 202-216 (e.g., a set of back-panel ports) and a second plurality of ports 218-232 (e.g., a set of front-panel ports). In some embodiments, each of ports 202-216 may allow for receiving test packets from a TG and each of ports 218-232 may send aggregated output to SUT 240 or 242. For example, by having TGs connected to physical ports of NS 116, NS 116 can provide high throughput traffic for testing SUT 240 and/or 242.

In some embodiments, scenario 400 may include testing SUTs 240 and 242 using test traffic generated by TGs 234-238 and aggregated using NS 116. For example, each of TGs 234-238 may be a separate or distinct device or unit capable of generating transport layer security (TLS)-encrypted test packets at a known rate (e.g., 100 Gbps). In this example, scenario 400 may require a throughput rate of TLS-encrypted packets higher than can be achieved by any single one of TGs 234-238. Continuing with this example, depending on the throughput rate required by scenario 400, two or more of TGs 234-238 may be needed to generate the required throughput rate (e.g. 200 Gbps), where the generated packets are aggregated and sent out via NS 116, e.g., using a front-panel port associated with SUT 240 or 242.

In some embodiments, e.g., when configuring test environment 100 for scenario 400, test system 102 or another entity (e.g., TC 104) may configure each of TGs 234-238 to generate and send test packets to NS 116 via a respective back-panel port, e.g., port 202, 212, or 214. For example, each of TGs 234-238 may be configured to generate a portion of test traffic for a virtual link '1' and another portion of test traffic for a virtual link '2' and send this traffic via a respective physical link to NS 116. In this example, each of TG 234-238 may be configured to add or insert an AGID (e.g., a PFC parameter value, a priority value, ERI, etc.) corresponding to a particular virtual link.

In some embodiments, e.g., to facilitate testing of scenario 400, test system 102 or another entity (e.g., TC 104, one of TGs 234-238, etc.) may configure NS 116 or entities thereof (e.g., ports 202-232 or related port processors) to aggregate and send test packets to SUTs 240 and 242. For example, TC 104 or TG 234 may generate or provide egress and ingress forwarding rules for installation at NS 116. In this example, each egress forwarding rule may indicate which front-panel port is to transmit or forward test packets (e.g., from TGs 234-238) associated with a given virtual link (e.g., as indicated by an AGID in the test packets) and ingress forwarding rules may indicate which back-panel port is to transmit or forward responses to test packets (e.g., from SUT 240 or 242) associated with a network address or other identifier.

In some embodiments, NS 116 or entities thereof (e.g., ports 202-232 or related port processors) may be configured to modify packets using forwarding rules or other information. For example, when a test packet is received at port 202 from TG 234, NS 116 or an entity thereof may delete or remove a VLAN tag comprising an AGID (e.g., a PFC value or a priority value) prior to forwarding the test packet onward to SUT 240. In this example, when a response to the test packet is received at port 220 from SUT 240, NS 116 or an entity thereof may add or modify a VLAN tag comprising an AGID such that the response is received by TG 234.

In some embodiments, in addition to or in lieu of facilitating traffic egress forwarding (e.g., from a back-panel port of NS 116 to a front-panel port of NS 116 (to SUT 240 or 242)) and ingress forwarding (e.g., from a front-panel port to a back-panel port (to one of TGs 234-238)), AGIDs that utilize PFC can be usable for mitigating traffic congestion by providing an ability to independently pause traffic on one virtual link (without pausing the other virtual links). For example, by using PFC values as AGIDs for egress routing, various entities in test environment 100 may utilize a PFC standard to send a pause frame for a particular virtual link without affecting other virtual links. In this example, similar to scenario 400 depicted in Figure, each of TGs 234-238 may concurrently generate test packets for two different virtual links (e.g., virtual link 1=AGID '2' and virtual link 2=AGID '6'). Continuing with this example, when NS 116 determines that port 220 is congested, NS 116 or a related entity may generate and send a pause frame for pausing TGs 234-238 from generating new test packets for a virtual link (e.g., virtual link 1) while leaving the other virtual link unaffected.

In some embodiments, AGIDs may be usable for facilitating traffic egress forwarding (e.g., from a back-panel port of NS 116 to a front-panel port of NS 116 (to SUT 240 or 242)) and ingress forwarding (e.g., from a front-panel port to a back-panel port (to one of TGs 234-238)). In some embodiments, each AGID may be stored or located in VLAN tags of test packets as a PFC value (e.g., a priority value). For example, TGs 234-238 may generate test packets comprising AGIDs as PFC values of VLAN tags. In this example, test related entities that utilize PFC-based AGIDs may support the PFC standard defined in IEEE 802.1Qbb or a similar standard but may impose minor restrictions on test packets generated or transmitted by TGs 234-238 (e.g., test packets may include any VLAN ID, but an AGID-independent or a separate non-AGID PFC value may not be available for use). In some embodiments, PFC-based AGIDs or related packet forwarding may utilize less resources than other forwarding methods in test environment 100. For example, instead of having to use large and/or complex lookup tables on NS 116 to map test packets with a large number of network addresses received on particular ingress ports to egress ports, NS 116 may utilize smaller or less complex lookup tables, such as tables that associate AGIDs to egress ports.

In some embodiments, e.g., after configuration by TC 104 or another entity, each of TGs 234-238 may assign a unique priority value to test packets associated with a different virtual link. For example, each of TGs 234-238 may encapsulate a respective priority value (e.g., an integer between 0-7 when utilizing the PFC standard defined in IEEE 802.1Qbb) in a test packet's VLAN tag (e.g., the priority value may be stored in the 802.1p field of the VLAN tag). In this example, for each virtual link or priority value, an egress forwarding rule may be installed by on NS 116 (e.g., by TC 104, one of TGs 234-238, or another entity) for forwarding test packets comprising the AGID (e.g., a priority value, such a) via a particular egress port, thereby NS 116 can send aggregated output from TGs 234-238 to SUT 240 or 242.

In some embodiments, AGID-based egress forwarding rules may utilize or include forwarding logic and related processing actions. For example, an egress forwarding rule may indicate that if a packet with a priority 'P' (e.g., AGID=2) arrives on a back-panel port 'B' (e.g., port 202) from TG 234, then the packet is to be forwarded via a front-panel port F (e.g., port 220) to SUT 240. In this example, the egress forwarding rule may also indicate that if the packet is tagged with a reserve VLAN tag, then the VLAN tag is to be stripped prior to forwarding. A corresponding routing rule will be installed on the ingress side using the link layer (MAC address) or network layer (IP address) of the incoming packet.

In some embodiments, AGID-based ingress forwarding rules may utilize or include forwarding logic and related processing actions and may correspond to a related egress forwarding rule. For example, an ingress forwarding rule may indicate that if a packet with a destination network address 'D' (e.g., a destination MAC address or a destination IP address associated with an emulated client) arrives on a front-panel port 'F' (e.g., port 220), then the packet is to be forwarded via a back-panel port 'B' (e.g., port 202) to TG 234. In this example, the ingress forwarding rule may also indicate that prior to forwarding the packet a priority value 'P' (e.g., AGID=2) is added in the packet's VLAN tag (if the packet does not already have a VLAN tag, then a reserved VLAN tag with the priority value 'P' is added to the packet).

In some embodiments, test system 102 or a related entity (e.g., TC 104 or TGs 234-238) may push or provision IP configuration at each of TGs 234-238. For example, each of TGs 234-238 may utilize a set of non-overlapping IP ranges for generated test packets, e.g., test packets from TG 234 may have a source IP address between 192.178.123.1-192.178.123.255; test packets from TG 236 may have a source IP address between 192.188.145.1-192.188.145.255; and test packets from TG 238 may have a source IP address between 192.64.95.1-192.64.95.255. In this example, non-overlapping IP ranges can allow ingress forwarding rules (e.g., implemented or installed at NS 116) to uniquely identify back-panel ports for forwarding packets to one of TGs 234-238 based on a destination IP address or portion thereof of a response from SUT 240 or 242.

Additional details regarding AGID-related forwarding rules and related usage is described below with regard to FIG. 3.

It will be appreciated that FIG. 4 is for illustrative purposes and that various depicted entities, their locations, and/or their functions described above in relation to FIG. 4 may be changed, altered, added, or removed.

FIG. 5 illustrates example forwarding rule data 500 usable for directing or causing traffic to be sent or forwarded via one or more port(s) (e.g., one of ports 202-232) and may also include or indicate relevant pre-forwarding actions. For example, data 500 may include identifiers, match criteria, instructions, commands, or executables usable by NS 116 or another entity (e.g., a switch processor or a port processor therein) for identifying relevant packets that need pre-forwarding processing (e.g., removing or replacing AGIDs or ERI) and, after processing, sending the packets to a destination (e.g., SUT 240 or 242) via an appropriate forwarding port (e.g., one of egress ports 202-232).

In some embodiments, data 500 or portions or variations thereof may be accessed and/or stored by NS 116, ports 202-232, and/or other entities using one or more data structures or storage devices (e.g., memory on or accessible to NS 116 or ports thereof).

Referring to FIG. 5, forwarding rule data 500 may be depicted using a table representing various forwarding rules, e.g., ingress rules for handling received test packets (e.g., from TGs 118) or responses thereof (e.g., from SUT 106) and egress rules for handling test packets that are to be transmitted (e.g., to SUT 106). For example, each table row depicted in FIG. 5 may represent an ingress or egress forwarding rule indicating a rule identifier for the rule, match criteria for identifying packets associated with the rule, pre-forwarding action(s) to perform on the packets associated with the rule, and a forwarding port for transmitting the packets associated with the rule.

In some embodiments, a rule identifier may include any suitable information for identifying a forwarding rule. For example, a rule identifier may be a value (e.g., an alphanumeric value, an integer, or a letter) that uniquely identifies a forwarding rule. In another example, a rule identifier may also indicate a direction (e.g., ingress or egress) or a port where the rule is deployed or utilized, e.g., front-panel ports or back-panel ports.

In some embodiments, match criteria may include any suitable information (e.g., a regular expression, a string of characters including wildcards, etc.) for identifying packets to be forwarded using an associated forwarding rule. For example, NS 116 or an entity thereof (e.g., a switch or port processor) may be configured to compare a parameter value including an AGID or ERI with match criteria to determine which, if any, forwarding rules match. In this example, NS 116 or an entity thereof may know which parameter to compare, e.g., based on rule metadata, test settings, or a network operator (e.g., user 110).

In some embodiments, pre-forwarding action(s) may include any suitable information (e.g., action identifiers, instructions, scripts, commands, etc.) for identifying one or more pre-forwarding actions to be performed on a packet associated with a forwarding rule.

In some embodiments, pre-forwarding action(s) may depend on the type of forwarding rules, test settings, and/or NS and TG configuration. For example, after a received packet from SUT 240 destined for TG 236 matches an ingress forwarding rule (e.g., rule '1' of data 500), NS 116 or an entity thereof (e.g., a switch processor or a port processor of port 220) may add an AGID or TG identifying information to the received packet such that the received packet can be forwarded or routed to the TG that generated the test packet associated with the received packet. In this example, NS 116 or an entity thereof (e.g., a switch or port processor) may access an address-to-port (or TG) data store for identifying the AGID or other TG identifying information. In another example, e.g., where no additional routing information is needed after a first forwarding rule is processed, NS 116 or an entity thereof (e.g., a switch or port processor) may not add an AGID or TG identifying information (e.g., pre-forwarding actions may not be needed or performed).

In another example, prior to a packet from TG 234 being sent to SUT 240, the packet to be transmitted may match an egress forwarding rule (e.g., rule '2' of data 500). In this example, NS 116 or an entity thereof (e.g., a switch processor or a port processor of port 202) may perform a pre-forwarding action involving modifying the packet to remove or replace the AGID (e.g., a PFC value, a digit in a destination MAC address, etc.) or related data (e.g., a VLAN ID tag). In some embodiments, removing or replacing the AGID may include deleting or removing a VLAN ID tag associated with an AGID (e.g., a PFC value representing an egress or forwarding port). In some embodiments, removing or replacing the AGID may include zeroing out the AGID or replacing it with some predetermined data. In some embodiments, replacing the AGID may involve querying or accessing a data store for appropriate replacement data. An example replacement scenario is described below with regard to FIG. 6.

In some embodiments, a forwarding port may include any suitable information (e.g., a port identifier, a value, a hexadecimal digit, etc.) for identifying a port for forwarding an associated packet. For example, a forwarding port portion of a forwarding rule may be static (e.g., port 202). In another example, a forwarding port portion of a forwarding rule may indicate that the forwarding port is determinable using an AGID located in the packet or a parameter value thereof. In this example, NS 116 or an entity thereof (e.g., a switch or port processor) may identify the forwarding port using the AGID and an AGID-to-port identifier data store.

It will be appreciated that data 500 in FIG. 5 is for illustrative purposes and that different and/or additional information may also be stored or maintained. Further, it will be appreciated that data 500 or related data may be stored in various data structures, memories, media, and/or in one or more locations.

FIG. 6 illustrates example replacement rule data 600 usable for replacing AGIDs (e.g., ERI or other information usable for forwarding, routing, or aggregation purposes) with replacement data. In some embodiments, data 600 may include any suitable information for determining packet data (e.g., the original four bits of a header parameter value) to replace an AGID (e.g., ERI). For example, e.g., prior to a test packet being sent toward SUT 242, port 228 or another entity of NS 116 (e.g., a switch or port processor) may be configured to remove an AGID, e.g., by removing an AGID from a parameter value and replacing the AGID with appropriate data, such as the data that the AGID supplanted, using data 600.

In some embodiments, data 600 or portions or variations thereof may be accessed and/or stored by NS 116, ports 202-232, and/or other entities using one or more data structures or storage devices.

Referring to FIG. 6, data 600 may be depicted using a table representing various replacement rules. For example, each table row depicted in FIG. 6 may represent a replacement rule indicating match criteria (e.g., a regular expression or a partial value with one or more wildcard digits for identifying a packet or related parameter value that contains an AGID) for identifying packets associated with the replacement rule and corresponding replacement data for replacing the AGID.

In some embodiments, match criteria may include any suitable information (e.g., a regular expression, a string of characters including wildcards, etc.) for identifying a packet portion (e.g., a header parameter value or portion thereof) that is to be modified by corresponding replacement data. For example, NS 116 or an entity thereof (e.g., a switch or port processor) may be configured to compare a predetermined parameter value including an AGID or ERI (e.g., determined by test settings or a network operator) with match criteria to determine which, if any, replacement rules match.

In some embodiments, replacement data may include any suitable information (e.g., a value, a hexadecimal digit, etc.) for replacing an AGID. In some embodiments, replacement data may be the same amount of bits or bytes as an AGID being replaced and, after replacement of the AGID with the replacement data, the parameter value may be accurate and/or usable for its intended or original purpose.

In some embodiments, NS 116 or an entity thereof (e.g., one of ports 218-232) may determine whether a packet parameter value or portion thereof (e.g., including or excluding the AGID) matches one of the match criteria (e.g., a partial MAC address with one or more wildcards in the hexadecimal value(s) where the AGID is located) and if there is a match, NS 116 or an entity thereof may replace the AGID with corresponding or associated replacement data. In some embodiments, the resulting value may be a packet parameter value that is accurate and/or usable for its intended or original purpose (e.g., a destination MAC address of SUT 240).

In some embodiments, where an AGID is located in a source MAC address parameter value or a destination MAC address parameter value, match criteria may indicate a MAC address where one or more AGID storing bits in the MAC address are not used for matching (e.g., the byte or digit locations of the one or more AGID storing bits may be wildcards in the match criteria value). For example, a destination MAC address (e.g., '00-B0-D0-63-C2-26', where the eighth hexadecimal digit represents the AGID) may match a particular match criteria value (e.g., '00-B0-D0-6*-C2-26') of a replacement rule. In this example, after matching the replacement rule, NS 116 or a related entity (e.g., a switch or port processor) may use corresponding replacement data (e.g., 'A') to replace the eighth hexadecimal digit (e.g., the last four bits of the fourth byte) of the destination MAC address. Continuing with this example, after replacement, the destination MAC address (e.g., '00-B0-D0-6A-C2-26') may be the actual MAC address associated with SUT 242.

In some embodiments, where an AGID is located in a source IP address parameter value or a destination IP address parameter value, match criteria may indicate an IP address where one or more AGID storing bits in the IP address are not used for matching (e.g., the byte or digit locations of the one or more AGID storing bits may be wildcards in the match criteria value). For example, a destination IP address (e.g., '175.45.23.7', where the last byte represent the AGID) may match a particular match criteria value (e.g., '175.45.23.*') of a replacement rule. In this example, after matching the replacement rule, NS 116 or a related entity (e.g., a switch or port processor) may use corresponding replacement data (e.g., '15') to replace the last byte (e.g., the last eight bits) of the destination IP address. Continuing with this example, after replacement, the destination IP address (e.g., '175.45.23.15') may be the actual IP address associated with SUT 242.

It will be appreciated that data 600 in FIG. 6 is for illustrative purposes and that different and/or additional information may also be stored or maintained. Further, it will be appreciated that data 600 or related data may be stored in various data structures, memories, media, and/or in one or more locations.

FIG. 7 is a block diagram illustrating an example process 700 for link multiplexing and forwarding packets in a test environment (e.g., environment 100). In some embodiments, example process 700 may include steps 702 and/or 704. In some embodiments, process 700, or portions thereof, may be performed by test system 102, NS 116, and/or another node or module. For example, process 700 may occur at a network switch (e.g., NS 116) comprising a first plurality of ports (e.g., ports 202-216) and a second plurality of ports (e.g., ports 218-232). In this example, each of the first plurality of ports is connected to one of a plurality of TGs (e.g., TGs 234-238) and each of the second plurality of ports is connected to a SUT (e.g., SUT 240 or SUT 242).

Referring to FIG. 7, in step 702, test packets may be received by a network switch via the first plurality of ports, where a first portion of the test packets may include a first AGID associated with a first egress port of the second plurality of ports. For example, each of TGs 234-238 may generate a portion of packets that include a PFC parameter value of '2' for testing SUT 240 and may send these packets to NS 116 via a respective port (e.g., ports 202, 212, or 214).

In step 704, the first portion of the test packets may be forwarded, using the first AGID and at least one corresponding egress forwarding rule, via the first egress port toward the SUT. For example, prior to receiving test packets, TC 104 or another entity may configure TGs 234-238 to generate a number of test packets with different AGIDs and may also configure NS 116 by providing forwarding rules indicating which egress port is used to forward packets comprising a particular AGID. In this example, each AGID may be associated with a unique egress port of NS 116 (e.g., one of eight front-panel ports).

In some embodiments, a first AGID (e.g., AGID '3') may include embedded routing information (e.g., 4 bits (e.g., '0011') of a destination MAC address) indicating a first egress port (e.g., port 222) in a packet header portion or a payload portion repurposed for storing the embedded routing information.

In some embodiments, prior to forwarding a first portion of test packets comprising a first AGID via a first egress port toward SUT 242, NS 116 may replace the first AGID of the first portion of the test packets with other data (e.g., bits for indicating an actual MAC address or portion thereof associated with a destination).

In some embodiments, replacing a first AGID may include using a data store (e.g., a data structure accessible by NS 116 or ports thereof storing data 600 or data supplanted by AGIDs and corresponding packet identifiers or match criteria) to determine or obtain the other data. In some embodiments, other data for replacing an AGID may include data previously supplanted by the AGID or embedding routing information or other data for replacing an AGID may include zeros or predetermined data.

In some embodiments, prior to receiving test packets, NS 116 may receive (e.g., from TC 104 or another entity) and install a first egress forwarding rule and a second egress forwarding rule associated with test packets received from a first TG of a plurality of TGs. In such embodiments, the first egress forwarding rule may indicate that the test packets comprising a first AGID received via a first ingress port of the first plurality of ports is to be forwarded via a first egress port of the second plurality of ports and the second egress forwarding rule may indicate that the test packets comprising a second AGID received via the first ingress port is to be forwarded via a second egress port of the second plurality of ports.

In some embodiments, prior to receiving test packets, NS 116 may receive (e.g., from TC 104 or another entity) and install a third egress forwarding rule and a fourth egress forwarding rule associated with test packets from a second TG of a plurality of TG. In such embodiments, the third egress forwarding rule may indicate that the test packets comprising the first AGID received via a second ingress port of the first plurality of ports is to be forwarded via the first egress port and the fourth egress forwarding rule may indicate that the test packets comprising the second AGID received via the second ingress port is to be forwarded via the second egress port; and In some embodiments, a first TG (e.g., TG 234) may be connected to a first ingress port (e.g., port 202) via a first link (e.g., a physical or virtual link), a second TG (e.g., TG 236) may be connected to a second ingress port (e.g., port 202) via a second link, and the SUT (e.g., SUT 240) may be connected to a first egress port (e.g., port 218) via a third link. In some embodiments, the third link (e.g., a fiber optic cable) may have a bandwidth (e.g., 10 gigabits per second (Gbps)) capable of transmitting the test packets comprising the first AGID generated by the first and the second TGs concurrently with no packet drops. For example, assume TGs 234 and 236 can each generate packets at 2 Gbps and a link between port 220 of NS 116 and SUT 240 has a bandwidth of 10 Gbps, then the link may be capable of transmitting the packets from TGs 234 and 236 concurrently with no packet drops. In this example, assuming each additional TG 118 could also generate packets at 2 Gbps, the link may handle packets generated from up to 5 TGs.

In some embodiments, NS 116 may receive and install ingress forwarding rules for forwarding responses from the SUT (e.g., SUT 242) to respective TGs that generated test traffic corresponding to the responses. In such embodiments, the ingress forwarding rules may use packet information (e.g., a network address, a link layer address, a MAC address, a network layer address, or an IP address) to identify the respective TGs.

For example, prior to receiving a response from the SUT, NS 116 may be configured for receiving and installing a first ingress forwarding rule for forwarding the response from the SUT (e.g., SUT 242) to a traffic generator (e.g., TG 234) that generated test traffic corresponding to the response, wherein the first ingress forwarding rule uses a network address, a link layer address, a media access control (MAC) address, a network layer address, or an internet protocol (IP) address (e.g., a destination IP address associated with an emulated client) to identify the traffic generator. In such embodiments, after receiving the response from the SUT, NS 116 may be configured for identifying, using the first ingress forwarding rule, the traffic generator to receive the response and adding an aggregation identifier associated with the traffic generator to the response prior to forwarding the response toward the traffic generator.

In some embodiments, a first AGID may include or utilize at least some portion of a PFC parameter value, a VLAN ID parameter value, a packet payload portion, a mandatory parameter value, an optional parameter value, a link layer parameter value, a network layer parameter value, a network address parameter value, a MAC address parameter value, a destination MAC address parameter value, a source MAC address parameter value, an IP header parameter value, an IP address parameter value, a destination IP address parameter value, a source IP address parameter value, a type of service parameter value, or a port parameter value. For example, an AGID may include 4 bits of a destination MAC address, a PFC value, or some other portion of a packet payload or packet header.

In some embodiments, NS 116 may include a programmable switching chip, a programmable switching ASIC, or a programmable network switch. For example, NS 116 may be a P4 programmable switch that can be configured by TC 104 or another related entity of environment 100.

In some embodiments, NS 116 may include a first plurality of ports that are back-panel ports (e.g., physical ports on the back side of a physical chassis of NS 116) and a second plurality of ports that are front-panel ports (e.g., physical ports on the front side of a physical chassis of NS 116).

In some embodiments, TC 104 may direct a first TG and a second TG to generate test packets with a first AGID. For example, TC 104 may configure TGs 234 and 236 to generate packets comprising an AGID of '3', e.g., where the AGID is embedded as the last 4 bits of the 4th byte in a destination MAC address in the packet header.

In some embodiments, a bit size of a first AGID may include enough bits to store an egress port identifier for identifying one of the second plurality of ports. For example, an AGID may be stored in a number of bits that can accommodate the largest identifier needed for identifying any port capable of sending test packets to SUT 240 or SUT 242, e.g., 4 bits can accommodate identifiers for up to 16 ports ($2^4$=16), 5 bits can accommodate identifiers for up to 32 ports ($2^5=32$), 6 bits can accommodate identifiers for up to 64 ports ($2^6=64$), 7 bits can accommodate identifiers for up to 16 ports ($2^7=128$), etc.

It will be appreciated that process 700 is for illustrative purposes and that different and/or additional actions may be used. It will also be appreciated that various actions described herein may occur in a different order or sequence.

It should be noted that test system 102, TC 104, NS 116, and/or various modules or functionality described herein may constitute a special purpose computing platform, device, or system. For example, test system 102 may be a network test appliance configured to perform various aspects described herein. Further, test system 102, TC 104, NS 116, and/or various modules or functionality described herein can improve the technological field of network testing by providing various techniques, systems, methods, or mechanisms for link multiplexing and forwarding packets in a test environment, e.g., by using embedding routing information and/or AGIDs and relevant forwarding rules.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for link multiplexing and forwarding packets in a test environment, the method comprising:

at a network switch comprising a first plurality of back-panel ports and a second plurality of front-panel ports, wherein each of the first plurality of back-panel ports is connected to one of a plurality of traffic generators and each of the second plurality of front-panel ports is connected to a system under test (SUT):

receiving, by the network switch, test packets via the first plurality of back-panel ports, wherein a first portion of the test packets includes a first aggregation identifier associated with a first egress port of the second plurality of front-panel ports, wherein the first aggregation identifier comprises a value that uniquely identifies the first egress port of the front-panel ports and is embedded within a destination media access control (MAC) address of each of the first portion of test packets; and forwarding, using the first aggregation identifier and at least one corresponding egress forwarding rule, the first portion of the test packets via the first egress port toward the SUT, wherein forwarding the first portion of the test packets using the first aggregation identifier includes comparing the first aggregation identifier to match criteria in the at least one corresponding egress forwarding rule that associates the first aggregation identifier with the first egress port of the front-panel ports.

2. The method of claim 1 wherein a portion of the destination MAC address is repurposed for storing embedded routing information.

3. The method of claim 1 comprising:

prior to forwarding the first portion of the test packets via the first egress port toward the SUT:

replacing the first aggregation identifier of the first portion of the test packets with other data.

4. The method of claim 3 wherein replacing the first aggregation identifier includes using a data store to determine or obtain the other data; the other data includes data previously supplanted by the first aggregation identifier; or the other data includes zeros or predetermined data.

5. The method of claim 1 comprising:

prior to receiving the test packets:

receiving, by the network switch, a first egress forwarding rule and a second egress forwarding rule associated with test packets received from a first traffic generator of the plurality of traffic generators, wherein the first egress forwarding rule indicates that the test packets comprising the first aggregation identifier received via a first ingress port of the first plurality of back-panel ports is to be forwarded via the first egress port of the second plurality of front-panel ports and the second egress forwarding rule indicates that the test packets comprising a second aggregation identifier received via the first ingress port are to be forwarded via a second egress port of the second plurality of front-panel ports;

receiving, by the network switch, a third egress forwarding rule and a fourth egress forwarding rule associated with test packets from a second traffic generator of the plurality of traffic generators, wherein the third egress forwarding rule indicates that the test packets comprising the first aggregation identifier received via a second ingress port of the first plurality of back-panel ports is to be forwarded via the first egress port and the fourth egress forwarding rule indicates that the test packets comprising the second aggregation identifier received via the second ingress port are to be forwarded via the second egress port; and installing the egress forwarding rules at the network switch.

6. The method of claim 5 wherein the first traffic generator is connected to the first ingress port via a first link, the second traffic generator is connected to the second ingress port via a second link, and the SUT is connected to the first egress port via a third link, wherein the third link has a bandwidth capable of transmitting the test packets comprising the first aggregation identifier generated by the first and the second traffic generators concurrently with no packet drops.

7. The method of claim 5 comprising:

at the network switch and prior to receiving a response from the SUT:

receiving and installing a first ingress forwarding rule for forwarding the response from the SUT to a traffic generator that generated test traffic corresponding to the response, wherein the first ingress forwarding rule uses a network address, a link layer address, a MAC address, a network layer address, or an internet protocol (IP) address to identify the traffic generator; and at the network switch and after receiving the response from the SUT:

identifying, using the first ingress forwarding rule, the traffic generator to receive the response; and adding an aggregation identifier associated with the traffic generator to the response prior to forwarding the response toward the traffic generator.

8. The method of claim 1 wherein the network switch includes a programmable switching chip, a programmable switching application-specific integrated circuit (ASIC), or a programmable network switch;

wherein a test controller directs a first traffic generator and a second traffic generator to generate the test packets with the first aggregation identifier; or wherein a bit size of the first aggregation identifier includes enough bits to store an egress port identifier for identifying one of the second plurality of ports.

9. A system for link multiplexing and forwarding packets in a test environment, the system comprising:

a network switch comprising a first plurality of back-panel ports and a second plurality of front-panel ports, wherein each of the first plurality of back-panel ports is connected to one of a plurality of traffic generators and each of the second plurality of front-panel ports is connected to a system under test (SUT), the network switch configured for:

receiving, by the network switch, test packets via the first plurality of back-panel ports, wherein a first portion of the test packets includes a first aggregation identifier associated with a first egress port of the second plurality of front-panel ports, wherein the first aggregation identifier comprises a value that uniquely identifies the first egress port of the front-panel ports and is embedded within a destination media access control (MAC) address of each of the first portion of the test packets; and forwarding, using the first aggregation identifier and at least one corresponding egress forwarding rule, the first portion of the test packets via the first egress port toward the SUT, wherein forwarding the first portion of the test packets using the first aggregation identifier includes comparing the first aggregation identifier to match criteria in the at least one corresponding egress forwarding rule that associates the first aggregation identifier with the first egress port of the front-panel ports.

10. The system of claim 9 wherein a portion of the destination MAC address is repurposed for storing embedded routing information.

11. The system of claim 9 wherein the network switch is configured for:

prior to forwarding the first portion of the test packets via the first egress port toward the SUT:

replacing the first aggregation identifier of the first portion of the test packets with other data.

12. The system of claim 11 wherein replacing the first aggregation identifier includes using a data store to determine or obtain the other data; the other data includes data previously supplanted by the first aggregation identifier; or the other data includes zeros or predetermined data.

13. The system of claim 9 wherein the network switch is configured for:

prior to receiving the test packets:

receiving, by the network switch, a first egress forwarding rule and a second egress forwarding rule associated with test packets received from a first traffic generator of the plurality of traffic generators, wherein the first egress forwarding rule indicates that the test packets comprising the first aggregation identifier received via a first ingress port of the first plurality of back-panel ports is to be forwarded via the first egress port of the second plurality of front-panel ports and the second egress forwarding rule indicates that the test packets comprising a second aggregation identifier received via the first ingress port are to be forwarded via a second egress port of the second plurality of front-panel ports;

receiving, by the network switch, a third egress forwarding rule and a fourth egress forwarding rule associated with test packets from a second traffic generator of the plurality of traffic generators, wherein the third egress forwarding rule indicates that the test packets comprising the first aggregation identifier received via a second ingress port of the first plurality of back-panel ports is to be forwarded via the first egress port and the fourth egress forwarding rule indicates that the test packets comprising the second aggregation identifier received via the second ingress port are to be forwarded via the second egress port; and installing the egress forwarding rules at the network switch.

14. The system of claim 13 wherein the first traffic generator is connected to the first ingress port via a first link, the second traffic generator is connected to the second ingress port via a second link, and the SUT is connected to the first egress port via a third link, wherein the third link has a bandwidth capable of transmitting the test packets comprising the first aggregation identifier generated by the first and the second traffic generators concurrently with no packet drops.

15. The system of claim 13 wherein the network switch is configured for:

prior to receiving a response from the SUT:

receiving and installing a first ingress forwarding rule for forwarding the response from the SUT to a traffic generator that generated test traffic corresponding to the response, wherein the first ingress forwarding rule uses a network address, a link layer address, a MAC address, a network layer address, or an internet protocol (IP) address to identify the traffic generator; and after receiving the response from the SUT:

identifying, using the first ingress forwarding rule, the traffic generator to receive the response; and adding an aggregation identifier associated with the traffic generator to the response prior to forwarding the response toward the traffic generator.

16. The system of claim 13 wherein the first aggregation identifier includes a priority-based flow control (PFC) parameter value and wherein the network switch is configured for:

when congestion is detected, sending a pause command or message associated with the PFC parameter value to pause test packets that includes the PFC parameter value generated by the first traffic generator or the second traffic generator.

17. The system of claim 9 wherein the network switch includes a programmable switching chip, a programmable switching application-specific integrated circuit (ASIC), or a programmable network switch;

wherein a test controller directs a first traffic generator and a second traffic generator to generate the test packets with the first aggregation identifier; or wherein a bit size of the first aggregation identifier includes enough bits to store an egress port identifier for identifying one of the second plurality of ports.

18. A non-transitory computer readable medium having stored thereon executable instructions embodied in the non-transitory computer readable medium that when executed by at least one processor of a network switch cause the network switch to perform steps comprising:

at the network switch comprising a first plurality of back-panel ports and a second plurality of front-panel ports, wherein each of the first plurality of back-panel ports is connected to one of a plurality of traffic generators and each of the second plurality of front-panel ports is connected to a system under test (SUT):

receiving, by the network switch, test packets via the first plurality of back-panel ports, wherein a first portion of the test packets includes a first aggregation identifier associated with a first egress port of the second plurality of front-panel ports, wherein the first aggregation identifier comprises a value that uniquely identifies the first egress port of the front-panel ports and is embedded within a destination media access control (MAC) address of each of the first portion of the test packets; and forwarding, using the first aggregation identifier and at least one corresponding egress forwarding rule, the first portion of the test packets via the first egress port toward the SUT, wherein forwarding the first portion of the test packets using the first aggregation identifier includes comparing the first aggregation identifier to match criteria in the at least one corresponding egress forwarding rule that associates the first aggregation identifier with the first egress port of the front-panel ports.

* * * * *